United States Patent [19]

Schwartz et al.

[11] 4,266,971
[45] May 12, 1981

[54] CONTINUOUS PROCESS OF CONVERTING NON-FERROUS METAL SULFIDE CONCENTRATES

[75] Inventors: Werner Schwartz, Frankfurt am Main; Peter Fischer, Bad Vilbel; Heinrich Traulsen, Schwalbach, all of Fed. Rep. of Germany

[73] Assignee: Metallgesellschaft Aktiengesellschaft, Frankfurt am Main, Fed. Rep. of Germany

[21] Appl. No.: 14,521

[22] Filed: Feb. 23, 1979

[30] Foreign Application Priority Data

Feb. 24, 1978 [DE] Fed. Rep. of Germany ....... 2807964

[51] Int. Cl.$^3$ ............................................. C22B 15/00
[52] U.S. Cl. .......................................... 75/69; 75/75; 75/77; 75/92; 75/21; 75/23
[58] Field of Search ................... 75/21, 23, 92, 69, 77, 75/72-75, 76; 266/173, 213, 248

[56] References Cited

U.S. PATENT DOCUMENTS

| | | | |
|---|---|---|---|
| 2,668,107 | 2/1954 | Gordon et al. | 75/74 |
| 3,437,475 | 4/1969 | Themelis et al. | 75/74 |
| 3,663,207 | 5/1972 | Themelis et al. | 75/77 |
| 3,941,587 | 3/1976 | Queneau et al. | 75/72 |

FOREIGN PATENT DOCUMENTS 2417978 11/1974 Fed. Rep. of Germany .............. 75/75

Primary Examiner—M. J. Andrews
Attorney, Agent, or Firm—Sprung, Felfe, Horn, Lynch & Kramer

[57] ABSTRACT

An improved continuous process for the conversion of a non-ferrous metal sulfide to form (A) a slag phase and (B) a non-ferrous metal phase of greater non-ferrous metal than the unconverted non-ferrous metal sulfide, by heating the non-ferrous metal sulfide in the form of a molten bath in a horizontal reactor provided with an oxidizing zone to which an oxidizing gas is added wherein in the oxidizing zone oxidation conditions predominate and a reducing zone to which a reducing gas is added and wherein in said reducing zone reducing conditions predominate is described. In the process, the slag is withdrawn from one end of the horizontal reactor while the non-ferrous metal phase is withdrawn from the other. In accordance with the invention, the gas atmosphere which develops in the horizontal reactor passes in counter-current flow to the flow of the slag phase and exhaust gas is withdrawn from the reactor at the same end of the reactor as is withdrawn the non-ferrous metal phase.

10 Claims, 1 Drawing Figure

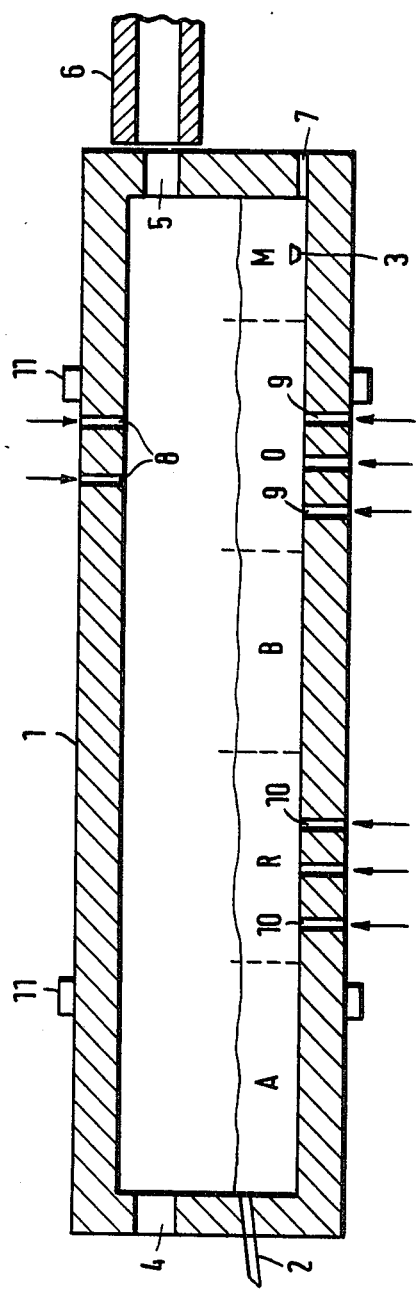

CONTINUOUS PROCESS OF CONVERTING NON-FERROUS METAL SULFIDE CONCENTRATES

BACKGROUND OF THE INVENTION

1. Field of the Invention

This invention relates to a continuous process for the conversion of a non-ferrous metal sulfide to form a slag phase of reduced sulfur content and a non-ferrous metal phase of greater non-ferrous metal content. More especially, this invention relates to a process for the conversion of a non-ferrous metal sulfide in a horizontal reactor which reactor is provided with both an oxidizing zone and a reducing zone in which oxidation and reduction conditions respectively predominate.

2. Discussion of the Prior Art

A process for the production of a slag phase and a non-ferrous metal phase by contacting non-ferrous metal sulfides with an oxidizing and reducing gas is disclosed in German Offenlegungsschrift No. 2,417,978 according to that process, the gas atmosphere in the reactor is caused to flow co-currently to the slag phase and the exhaust gas is withdrawn from the reactor at the same end as the slag phase, which has a low non-ferrous metal content. That known process is thermally self-sufficient.

It is an object of the invention to provide a process whereby the non-ferrous metal content of the slag phase is further decreased and heat is more efficiently utilized in the reactor. It is a further object of this invention to provide a process in which additional heat can be added to the mixture of metal phases.

SUMMARY OF THE INVENTION

The foregoing objects are provided, in accordance with this invention by an improved continuous process for the conversion of the non-ferrous metal sulfide whereby to form A. a slag phase and B. a non-ferrous metal phase of greater non-ferrous metal content than the unconverted non-ferrous metal sulfide; by heating non-ferrous metal sulfide in the form of a molten bath in a horizontal reactor provided with an oxidizing zone to which an oxidizing gas is added wherein in said oxidizing zone oxidation conditions predominate and a reducing zone to which a reducing agent is added and wherein in said reducing zone reducing conditions predominate and said slag phase is withdrawn from one end of said horizontal reactor and said non-ferrous metal phase is withdrawn from the other end of said horizontal reactor, the improvement comprising passing the gas atmosphere which develops in said reactor in a counter-current direction to that of said slag phase and withdrawing exhaust gas from said reactor at the same end of said reactor as said non-ferrous metal phase is withdrawn.

The present invention therefore relates to a continuous process for converting non-ferrous metal sulfide concentrates to form a liquid phase which is rich in non-ferrous metal and a slag phase in an elongated horizontal reactor under a gas atmosphere. The horizontal reactor comprises $SO_2$-containing zones in which concentrates of sulfides of non-ferrous metal, e.g., copper, nickel, antimony, cobalt or lead or mixtures thereof are charged onto a molten bath. Oxidizing gases and reducing agents are blown into the molten bath in oxidizing and reducing zones respectively. A phase having a high non-ferrous metal content and a phase having a low non-ferrous metal content are formed and these phases are discharged at opposite ends of the reactor. The phases are caused to flow counter-currently in the form of substantially continuous layers to the respective outlet ends of the reactor. Oxidizing gas, e.g., oxygen or oxygen enriched air, is introduced into the molten bath in the oxidation zone preferably from below through nozzles spaced apart along the oxidizing zone. The solids are added to the reactor preferably through a plurality of feeders also disposed at separate locations spaced apart from one another along a considerable length of the reactor. By the use of a plurality of feeders, the feed of solids to be converted can be controlled at different points independently of one another.

The feed of the solid non-ferrous metal sulfide to be converted and the rate at which oxygen is introduced are so selected such that the activity of oxidizing gas in the molten bath has a maximum at the outlet end of the horizontal reactor where the phase which has a higher non-ferrous metal content and a low iron content is discharged. The oxygen feed rate and solid feed rate are preferably regulated to permit production of a phase of high non-ferrous metal content and a slag phase. The oxygen partial pressure decreases progressively toward and through the reduction zone so that it is at a minimum at the outlet end where the slag phase is discharged. The slag phase has a low non-ferrous metal content.

Preferably, a gaseous or liquid protective media is blown into the molten bath at controlled rates together with the oxidizing gas in order to protect the nozzles and the linings which surround the nozzles and to assist the control of the processing temperatures. The rates at which gas is blown into the molten bath are controlled so that an agitation which is sufficient for an effective mass transfer is provided in the bath and the layers formed by the flowing phases and gradient of oxygen activity are substantially maintained.

A preferred mode of the invention involves withdrawal of the exhaust gases through the end face of the reactor or upwardly or laterally near the end face. With respect to the gradient of the oxygen activity and the control of the temperature in the molten bath, the process can immediately be carried out in the manner described in German Offenlegungsschrift No. 2,417,978, disclosure of which is hereby specifically incorporated herein by reference. On the other hand, the oxygen potential and the gas atmosphere is changed because the slag phase and the gas atmosphere flow counter-currently so that the oxygen potential and and the $SO_2$ content are much decreased, particularly over the reducing zone. The nozzles may be arranged one beside the other in a plurality of rows so that the molten bath is throughly contacted with the gas bubbling through the molten bath without need for an angular oscillation of the reactor about its longitudinal axis.

According to a preferred feature, fuel is blown into the molten bath at least in the reducing zone, an oxygen partial pressure below $10^{-3}$ bar, preferably below $10^{-8}$ bar, is maintained in the gas atmosphere over the reducing zone, and $SO_2$ is not blown as a protective gas into the reducing zone. The fuel may be liquid, gaseous or solid. Its combustion is controlled in such a manner that the required heat is produced and the conditions required for the reduction are maintained in the molten bath and in the gas phase. The protective gases for the nozzles may consist of hydrocarbons which are subsequently used as fuels, or of inert gases, such as nitrogen. As has been described in German Offenlegungsschrift No. 2,417,978, $SO_2$ may be used as a protective gas in the oxidizing zone. The blowing of the fuel directly into the molten bath results in a good heat transfer to the material to be melted so that a high utilization of the fuel is enabled in conjunction with low temperatures of the arched roof of the reactor. In the processing of lead mineral concentrates, good results have been obtained with a gas atmosphere having an oxygen partial pressure up to $10^{-3}$ bar. These results can be further improved at lower oxygen partial pressures. An oxygen partial pressure below $10^{-8}$ bar is required for a processing of copper mineral concentrates. In this way, each zone of the furnace can be operated at temperatures and under conditions which are most favorable from physical and chemical aspects. If a supply of additional heat is required, particularly in the processing of low-sulfur concentrates, a burner may be provided at the end face of the reducing zone and/or fuel may be introduced into the oxidizing zone through nozzles or together with solids. The burner must be operated so that the requirements regarding the oxygen potential in the gas phase are fulfilled.

According to a preferred feature, a stilling zone is provided between the reducing zone and the oxidizing zone and no gas is blown into the molten bath in said stilling zone. This results in a good separation between the gas atmospheres in the reducing zone and oxidizing zone and permits the temperature in each zone to be individually controlled and results in a separation of the high-sulfide metal phase from the high-metal slag phase in the stilling zone so that a low sulfide activity in the reducing zone is ensured.

According to a preferred feature, in the processing of lead sulfide concentrates or antimony sulfide concentrates, most of the lead sulfide or antimony sulfide contained in the fine dust in the exhaust gas conduit or exhaust gas cooler is oxidized to lead sulfate or antimony oxide and antimony sulfate, as the case may be, by contacting the same with an oxygen-containing gas at a temperature of 450°–950° C. The fine dust which is separated is admixed in an amount of 10–30% by weight, based on the charged solids, with the lead concentrate or antimony concentrate and other metal sulfate-containing materials, if desired. Even at relatively low temperatures, the admixture of the oxidized fine dust results in a reaction with the sulfide concentrates without need for a supply of additional oxygen. The fast conversion reduces the loss of metals by evaporation. For that purpose, a close contact between the constitutents of the charged solids is essential.

According to a preferred feature, the concentrates and any admixtures are compacted before being charged into the reactor. This will result in a particularly close contact between the concentrates and the admixtures, such as lime, $SiO_2$, iron oxide, recycled find dust, any other metal sulfate-containing substances and carbon. Compacting may be effected, e.g., by tumbling, pelletizing, or pressing. The moist particles which have been compacted fall quickly through the gas atmosphere, and the reaction takes place in the molten bath. Because the particles are moist, the temperature rises slowly so that the losses by evaporation are minimized.

The invention will be explained more fully and by way of example with reference to the drawing and examples.

BRIEF DESCRIPTION OF DRAWING

Referring to the appended drawing, the same is a transverse sectional view showing a reactor employed for carrying out the process.

DESCRIPTION OF SPECIFIC EMBODIMENT

Referring to the drawing, the reactor 1 consists of a long furnace which has a rounded cross-section. A slag outlet 2 is provided in the left-hand end wall and a tap 3 for the phase which has a high non-ferrous metal content is provided near the right-hand end wall. An opening 4 provided in the left-hand end wall may be used as a working door or may contain a burner. A gas outlet opening 5 is provided in the right-hand end wall and communicates with the exhaust gas duct 6. An emergency tap 7 is also provided in the right-hand ended wall. The reactor 1 is divided into a working zone A, reducing zone R, stilling zone B, oxidizing zone O and resting zone M. The zones are not distinctly separate from one another but merge into each other. The oxidizing zone O is provided with charging openings 8 and nozzles 9, only some of which are diagrammatically indicated. The reducing zone R is also provided with nozzles 10, only some of which are diagrammatically indicated. The reactor 1 is mounted on bearing rings 11 and can be rotated for maintenance.

In carrying out the invention, the oxidizing zone is maintained at a temperature between 760° and 1650° C. preferably for lead between 950° and 1050° C., for nickel between 1470° and 1610° C., for copper between 1200° and 1350° C. and for antimony between 780° and 890° C. Generally, there is present between 0.8 and 1.5 times the stoichiometric amount of oxygen relevant to the non-ferrous metal sulfide preferably between 1.0 and 1.3 the stoichiometric quantity. The oxygen partial pressure in the oxidation zone is maintained at $10^{-8}$ to $10^{-2}$ bar. Generally speaking, the non-ferrous metal sulfide reacts in the oxidizing zone for between about 0.1 and 10 minutes.

The reducing zone is maintained at a temperature from equal up to about 200° C. higher than that temperature of the oxidizing zone under an oxidizing partial pressure of between $10^{-10}$ and $10^{-5}$ bars, preferably. The non-ferrous metal containing material is subjected to reducing conditions in the reducing zone for a period of between 10 and 300 minutes preferably between 20 and 100 minutes. The reducing gas is present in an amount of between 1.0 and 3.0 the stoichiometric amount preferably between 1.1 and 1.8 the stoichiometric amount required to completely reduce the non-ferrous metal containing mass in the reduction zone.

In order to more fully illustrate the invention and the manner of practicing the same, the following examples are presented:

EXAMPLE 1

Lead mineral concentrates were processed in a pilot reactor having an overall length of 4.8 meters and a diameter of 1.8 meters. In a reactor of such limited length, a continuous operation involving counter-current streams of lead, slag, and exhaust gas was not possible. For this reason the most significant steps of the process were carried out one after the other. These steps consisted of (1) the partial oxidation of the pellets consisting of a mixture of the concentrate, fluxes and fine dust to form metallic lead and a high-pbO slag; this was accomplished in that oxygen was blown into the molten bath; and (2) the reduction of the PbO of the slag by the introduction of reducing agents.

(1) The reactor was preheated to an interior temperature of 1100° C. by means of an oxygen-propane burner. 2,200 tons of bar lead are then charged through the burner door and melted. At a rate of 2.04 tons per hour, non-dried concentrate pellets consisting of 70% lead mineral concentrate, 20% recycled fine dust and 10% fluxes were charged into the molten bath at 1100° C. and were oxidized with oxygen. The pellets contained 8% by weight of moisture and had the following composition in percent by weight on a dry basis:

59.1 Pb, 2.4 Zn, 0.96 Cu, 12.45 S, 6.8 FeO, 0.6 $Al_2O_3$, 2.4 CaO, 0.6 MgO and 11.4 $SiO_2$.

A slag which contained 40.7% by weight of Pb was tapped when the experiment had been terminated. The crude lead bullion contained 1.05% by weight of sulfur. The lead contained in the pellets (total 1546 kg) was distributed as follows:
Crude lead bullion: 58.6%
Slag: 24.0%
Fine dust: 17.4%

It is apparent that the quantity of lead which was tapped, inclusive of the previously charged bar lead, amounted to 3.098 tons.

(a) 1000 Grams of the above-mentioned slag which contained 40.7% Pb by weight were melted in a graphite crucible in a Tamman furnace. Mixed gases consisting of 20% $SO_2$ by volume of $SO_2$ and 80% $N_2$ by volume were blown at a rate of 2.0 standard liters per minute onto surface of the molten bath to provide a gas atmosphere having an $SO_2$ partial pressure of about 0.2 bar. At the same time, the slag was reduced in that finely ground coal was stirred into the slag in an amount which was 1.5 times the stoichiometric requirement. The reduction temperature was 1150° C. When stirring with a graphite bar had been continued for 1 hour, the following products were obtained:
588 grams slag containing 4.2% Pb by weight
282 grams lead containing 3.4% S by weight
the calculated lead loss amounted to 110 grams or 27.0% of the lead content of the intermediate product.

(b) In an analogous experiment, only $N_2$ at a rate of 2 standard liters per minute was blown onto the surface of the molten bath whereas all other conditions were the same. This resulted in
589 grams slag containing 4.05% by weight of Pb
363 grams lead containing 99.7% by weight Pb
The calculated lead loss amounted only to 21 grams or 5.2% of the lead content of the intermediate product.

It is apparent that under an $SO_2$-free gas atmosphere the Pb contents of the slag can be decreased to values which are as low as those obtained under a gas atmosphere which contains 20% $SO_2$ by volume and that the loss of lead by evaporation is decreased to one-fifth.

EXAMPLE 2

In the reactor described hereinbefore, concentrate pellets having a moisture content of 7.61% by weight and having a content of 53.2% Pb by weight on a dry basis were continuously charged at a rate of 2.85 tons per hour into a bath of 2.351 tons of molten lead and into said bath at 1080° C. oxygen was continuously introduced by flowing. The resulting primary slag contained 65.2% Pb by weight. The molten lead contained 0.3% by weight of S.

When a total of 4.820 tons of pellets, having a Pb content of 2.369 tons, had been charged, the furnace was completely filled by the slag and lead which was present.

The supply of oxygen was then discontinued and powderized coal at a rate of 1 kg/min. together with nitrogen was introduced by blowing the mixture through two lances into the slag layer. Coal was used in an amount which was 1.5 times the stoichiometric requirement. The temperature during the reduction amounted to 1160° C.

The experiment resulted in the following products:
1,448 kg slag containing 2.2% lead by weight
4,198 kg lead containing 0.2% S by weight.

The calculated lead loss amounted to 498 kg or 21.0% of the lead content of the pellets.

It is apparent that this process results in a low-sulfur lead and that the loss of lead by evaporation can be restricted to a low value, provided that there are low sulfur activities in the molten bath.

EXAMPLE 3

Concentrate pellets containing 7.61% moisture by weight and having a Pb content of 53.2% by weight on a dry basis were charged at a rate of 2.65 tons per hour into a bath of 2,420 tons of molten lead and in said bath were continuously blown at a temperature of 1050° C. with oxygen. The resulting slag contained 63.2% by weight of lead. The molten lead bath contained 0.4% by weight. When the furnace was completely filled by the existing lead and slag, hydrogen gas was blown into the molten bath from below through nozzles while the two charging openings having size of 100×100 $mm^2$ provided at the top of the furnace were open and a subatmospheric pressure of only $2 \times 10^{-3}$ bar was maintained in the furnace.

In spite of the blowing of $H_2$ gas at a rate of 150 standard $m^3$ per hour, corresponding to an amount which was twice the stoichiometric requirement, it was not possible to reduce the lead content of the slag below 55.7% by weight because air which leaked into the furnace by suction immediately re-oxidized and slagged the previously reduced lead.

The advantages afforded by the invention reside in that the control of the composition of the gas phase and of the temperature in the reducing zone results in a substantial decrease of the metal content of the slag phase and prevents a sulfidization of the resulting metals. Whereas a low oxygen potential must be maintained in the reducing zone in the processing of metals which form sulfides having a low volatility, it may be of advantage to maintain an $SO_2$ partial pressure which is so high that the metal sulfides formed by the reduction have a much lower solubility in the slag than the metals. The utilization of heat is much improved because the heat content of the gases from the reducing zone can be utilized to a large extent in the oxidizing zone. In the reducing zone, a temperature which is as high as possible should be maintained for metallurgical reasons and a surplus of reducing agent should be supplied. Particularly in the processing of low-sulfur and low-iron concentrates, the heat which is required can be supplied economically without increasing the oxygen potential above the limit which is permissible during the reduction.

From the results of examples 1 to 3 the following example for carrying out the invention in a continuous process was calculated.

1.070 Tons (dry basis) of concentrate containing 71.4 wt.-% Pb, 3.0 wt.-% Zn, and 14.5 wt.-% S, are mixed and pelletized together with 77 tons (dry basis) of silica sand, 37 tons (dry basis) of slaked lime which corresponds to 26.6 t contained CaO, 118 tons (dry basis) of fine grained iron oxide (hematite or pyrite cinders), and 214 tons of recycled flue dust to give 1650 tons of green pellets containing 8 wt.-% moisture.

Flux additions are apportioned to form, after reduction, a discard slag which has the following composition:

approx. 2 wt.-% Pb
approx. 10 wt.-% Zn
approx. 14 wt.-% CaO+MgO+BaO
approx. 39 wt.-% FeO+Al$_2$O$_3$
approx. 30 wt.-% SiO$_2$ The pellets are continuously fed into two reactors of about 35 m length and 3,5 m diameter (outside) that contain a bottom layer of low-sulfur bullion and a top layer of slag, the Pb content of which will amount to about 50 wt.-% within the oxidation and smelting zones, and will gradually decrease to about 2 wt.-% at the end of the reduction zones.

A total of 112.000 m$^3$ of oxygen is blown into the melt to oxidize the charge, another 22.000 m$^3$ of nitrogen being used as shield gas for the injectors. The slag temperature within the oxidation zones will be limited to about 950° to 1050° C.

The Pb-rich primary slag being formed within the oxidation zones runs continuously into the reduction zones of the reactors where it is deleaded under a gradually increasing temperature and reduction potential. A total of 36 tons of pulverized coal is blown into the slag by means of 36 000 m$^3$ of carrier air. The slag temperature is raised to about 1100° to 1150° C. at the end of the reduction zones, so that, after settling of suspended lead droplets, a well-fluid slag in an amount of about 340 t can be tapped continuously. To cover the heat comsumption within the reduction zones additional 60 tons of pulverized coal are burnt together with 120.000 m$^3$ of carrier air and 84.000 m$^3$ of oxygen.

The furnace off-gases are cooled to about 400° C. within waste heat boilers thus recovering a considerable quantity of medium-pressure steam that will contribute to the mechanical energy being required for oxygen production in an air separation plant.

The SO$_2$-rich off-gases (a total of about 790.000 m$^3$ containing about 18 vol.-% SO$_2$ on a dry basis) are further cleaned and cooled in hot electroprecipitators, spray towers, and wet electroprecipitators, and are then introduced into the—more or less conventional—double catalyst sulfuric acid plant being not under consideration.

The flue dust (about 218 tons) being precipitated from the off-gas is recycled to the pelletizing section, except a small bleed-off which has been assumed to amount to about 2% of total flue dust on an average. Of course, this will depend on the composition of the concentrate, and it may turn out during continuous operation that any bleed-off can be avoided.

The secondary lead that has been recovered within the reduction zone of the two reactors runs back into the oxidation zones where mixing with primary lead (about 50% of total production) and, possibly, even a certain pre-refining occur. The bullion amounting to about 760 t is continuously tapped via siphons and collected in hot-drossing kettles.

What is claimed is:

1. A continuous process for the conversion of a non-ferrous metal sulfide whereby to form:
    (a) a slag phase and
    (b) a non-ferrous metal phase of greater non-ferrous metal than the unconverted non-ferrous metal sulfide which comprises feeding said non-ferrous metal sulfide onto a molten bath at a plurality of points along the length of a horizontal reactor into said horizontal reactor and heating the same therein, said horizontal reactor provided with an oxidizing zone to which an oxidizing gas is added wherein in said oxidizing zone oxidation conditions predominate and a reducing zone to which a reducing gas is added and wherein in said reducing zone reducing conditions predominate, while maintaining a concentration of oxidizing gas in the gas atmosphere which develops in the reactor such that the concentration of the oxidizing gas progressively decreases through said reducing zone to a minimum point where the slag phase is removed, stepwise introducing an oxidizing gas into the molten bath by passing the same oxidizing gas through nozzles disposed below the level of said molten bath, withdrawing said slag phase from one end of said horizontal reactor and said non-ferrous metal phase from the other end of the reactor, passing the gas atmosphere which develops in said reactor in a countercurrent direction to said slag phase and withdrawing exhaust gas from said reactor at the same end of said reactor as said non-ferrous metal phase is withdrawn.

2. A process according to claim 1 wherein a gaseous or liquid protective media is present in admixture with the oxidizing gas and the admixture is blown into said oxidation zone through nozzles in the bottom of said horizontal reactor.

3. A process according to claim 2 wherein the rate at which said admixture is introduced is sufficient to effect agitation of the phases within said horizontal reactor and maintenance of said phases.

4. A process according to claim 1 wherein fuel is blown into said molten bath at least in the region of said reducing zone and an oxygen partial pressure below 10$^{-3}$ bar is maintained in the gas atmosphere over the reducing zone and SO$_2$ is not blown as a protective gas into the reducing zone.

5. A process according to claim 4 wherein the oxygen partial pressure and the gas atmosphere over the reducing zone is below 10$^{-8}$ bar.

6. A process according to claim 1 wherein between said oxdizing zone and said reducing zone there is a stilling zone and no gas is blown into the molten bath in the region over said stilling zone.

7. A process according to claim 1 wherein said non-ferrous metal sulfide is a lead sulfide or antimony sulfide concentrate, lead sulfide or antimony sulfide contained in the form of fine dust in an exhaust gas conduit or exhaust gas cooler of said horizontal reactor is oxidized to lead sulfate or antimony oxide or antimony sulfate as the case may be at a temperature of 450° to 950° C.

8. A process according to claim 7 wherein the so oxidized lead sulfate antimony oxide or antimony sulfate is removed from said exhaust gas conduit or said exhaust gas cooler and admixed in an amount of 10 to 30% by weight, based upon the weight of charged solids, with lead sulfide or antimony sulfide concentrate to be converted alone or in admixture with other metal sulfate containing materials.

9. A process according to claim 1 wherein the non-ferrous metal sulfide is in the form of a compacted particle and said compacted particle is fed to said horizontal reactor.

10. A process according to claim 1, wherein said non-ferrous metal sulfide is fed onto said molten bath in the form a solid material.

* * * * *